(12) United States Patent
Karmarkar et al.

(10) Patent No.: US 12,153,664 B2
(45) Date of Patent: Nov. 26, 2024

(54) SYSTEM AND METHOD FOR DETECTION OF PATTERNS IN APPLICATION FOR APPLICATION TRANSFORMATION AND APPLYING THOSE PATTERNS FOR AUTOMATED APPLICATION TRANSFORMATION

(71) Applicant: CLOUDHEDGE TECHNOLOGIES PRIVATE LIMITED, Maharashtra (IN)

(72) Inventors: Sameer Karmarkar, Pune (IN); Ameya Varade, Pune (IN); Abhijit Anant Joshi, Pune (IN)

(73) Assignee: CLOUDHEDGE TECHNOLOGIES PRIVATE LIMITED, Maharashtra (IN)

( * ) Notice: Subject to any disclaimer, the term of this patent is extended or adjusted under 35 U.S.C. 154(b) by 304 days.

(21) Appl. No.: 17/591,956

(22) Filed: Feb. 3, 2022

(65) Prior Publication Data
US 2022/0245274 A1    Aug. 4, 2022

(51) Int. Cl.
*G06F 21/50* (2013.01)
*G06F 9/455* (2018.01)
(Continued)

(52) U.S. Cl.
CPC .......... *G06F 21/50* (2013.01); *G06F 9/45558* (2013.01); *G06F 16/174* (2019.01);
(Continued)

(58) Field of Classification Search
CPC .. G06F 21/50; G06F 21/6236; G06F 9/45558; G06F 18/214; G06F 18/2193;
(Continued)

(56) References Cited

U.S. PATENT DOCUMENTS 9,992,211 B1 *  6/2018  Viljoen ................ G06F 21/577
2005/0080649 A1  4/2005  Alvarez et al.
(Continued)

FOREIGN PATENT DOCUMENTS

CN    112632556 A  *  4/2021  .......... G06F 21/577
CN    113268474 A  *  8/2021
(Continued)

*Primary Examiner* — Sarah Su
(74) *Attorney, Agent, or Firm* — Renner, Otto, Boisselle & Sklar, LLP

(57) ABSTRACT

Disclosed are a system and a method for detection of patterns in application for application transformation and applying those patterns for automated application transformation. The system and the method enable user to identify patterns in transformation of the application from existing infrastructure/machines of organization. The transformed application thus created are easily exported and/or installed on multiple computing devices having different system architecture and successful execution of the application containerized within the container is facilitated. The system and the method reduce dependency on individual skills and ability. The system and the method bring consistency and efficiency in application transformation and increase performance of existing techniques that effect application transformation.

8 Claims, 2 Drawing Sheets

(51) Int. Cl.
  *G06F 16/174* (2019.01)
  *G06F 18/21* (2023.01)
  *G06F 18/214* (2023.01)
  *G06F 21/62* (2013.01)

(52) U.S. Cl.
  CPC ........ *G06F 18/214* (2023.01); *G06F 18/2193* (2023.01); *G06F 21/6236* (2013.01); *G06F 2009/45579* (2013.01); *G06F 2009/45587* (2013.01); *G06F 2221/2143* (2013.01)

(58) Field of Classification Search
  CPC ........... G06F 18/21; G06F 2009/45579; G06F 2009/45587; G06F 8/76; G06N 5/025; G06N 20/00
  See application file for complete search history.

(56) References Cited

U.S. PATENT DOCUMENTS

| | | | |
|---|---|---|---|
| 2006/0143055 A1 | 6/2006 | Loy et al. | |
| 2009/0070153 A1 | 3/2009 | Chien et al. | |
| 2016/0012542 A1 | 1/2016 | Steben et al. | |
| 2018/0060897 A1 | 3/2018 | Loosli et al. | |
| 2019/0251514 A1* | 8/2019 | Verones | G06Q 10/1053 |
| 2020/0302029 A1* | 9/2020 | Holm | G06V 10/82 |
| 2020/0349257 A1* | 11/2020 | Saffar | G06F 21/563 |
| 2021/0042368 A1* | 2/2021 | Liu | G06F 16/955 |
| 2021/0240853 A1* | 8/2021 | Carlson | G16H 10/20 |
| 2021/0374241 A1* | 12/2021 | Parikh | G06F 18/214 |
| 2022/0020087 A1* | 1/2022 | Sundarajan | G06N 20/00 |
| 2022/0237483 A1* | 7/2022 | Mossler | G06F 11/3664 |
| 2022/0413814 A1* | 12/2022 | Mukherjee | G06F 9/451 |
| 2023/0044288 A1* | 2/2023 | Gopalakrishnan | G06F 16/24564 |
| 2023/0205877 A1* | 6/2023 | Ulasen | G06F 21/566 726/23 |
| 2023/0214317 A1* | 7/2023 | Jayaprasad | G06N 5/04 714/26 |
| 2023/0419036 A1* | 12/2023 | Wang | G06F 40/284 |
| 2024/0045971 A1* | 2/2024 | Ben Salem | G06F 21/54 |
| 2024/0061674 A1* | 2/2024 | Zolotow | G06F 11/3612 |

FOREIGN PATENT DOCUMENTS

| | | | | |
|---|---|---|---|---|
| CN | 114138911 A | * | 3/2022 | |
| CN | 114510526 A | * | 5/2022 | |
| CN | 114911773 A | * | 8/2022 | ............ G06F 16/211 |
| CN | 115114271 A | * | 9/2022 | |
| WO | WO-2013091025 A1 | * | 6/2013 | .......... G06F 11/1446 |
| WO | WO-2020219685 A1 | * | 10/2020 | ............. G06N 20/00 |

* cited by examiner

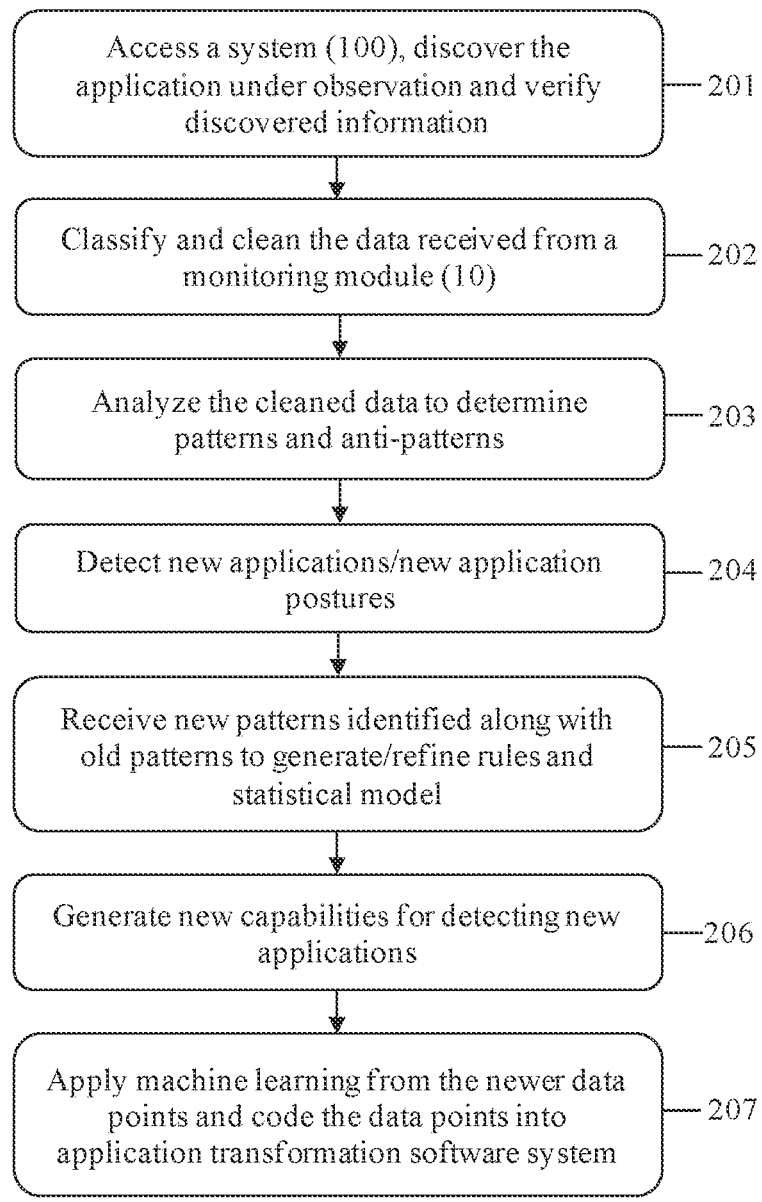

ium SYSTEM AND METHOD FOR DETECTION OF PATTERNS IN APPLICATION FOR APPLICATION TRANSFORMATION AND APPLYING THOSE PATTERNS FOR AUTOMATED APPLICATION TRANSFORMATION

CROSS-REFERENCE TO RELATED APPLICATIONS

This United States patent application relies for priority on and claims priority to Indian Patent Application No. 202021033237, filed on Feb. 3, 2021, the entire content of which is incorporated herein by reference for all purposes.

FIELD OF THE INVENTION

The present invention relates to a computer system, and more particularly provides a system and a method for detection of patterns in application for application transformation and applying those patterns for automated application transformation.

BACKGROUND OF THE INVENTION

Containers provide flexibility in deploying and managing a wide array of applications. However, performance of existing technologies and systems that convert existing applications into containers depend largely on the skills and knowledge of the personnel involved in managing the applications. Thus, making it difficult to be efficient and consistent for following the application transformation. In addition, large dependency on the personnel, amount of time it takes to analyze complexity and size of existing application systems manually makes it difficult to provide predictable timelines for transformation. Certain other existing systems contain scripts that address few of the afore-stated problems, but do not provide any intelligent automation for identifying patterns involved in transformation of the application and applying those patterns for automated application transformation.

Therefore, there exists a need to provide a system and a method for identifying patterns of application that addresses the afore-stated drawbacks of the existing systems. Further, there is a need for a system and a method that automates intelligent pattern recognition in applications thereby reducing complexity in transformation and a large chunk of manual work associated therewith.

OBJECTS OF THE INVENTION

An object of the present invention is to provide a cost effective and efficient system and a method for intelligent pattern recognition in application transformation.

Another object of the present invention is to facilitate intelligent pattern recognition in application transformation that is independent of the skills and knowledge of the personnel's involved in transformation.

SUMMARY OF THE INVENTION

Accordingly, the present invention provides a system for detection of patterns in application for application transformation and applying those patterns for automated application transformation. The system is configured on a computing device. The system comprises a monitoring module, a data collection module, a data analyzing module, a pattern recognition module, a training module, a feature generation module and a feedback module.

The monitoring module is configured to collect new datasets about an application under observation. Specifically, meta-data of the application under observation is collected. The data collection module is configured to classify and clean the data received from the monitoring module. The data collection module classifies the data based on type into a file system data and a network system interaction data. The data collection module collects all requisite files required for independent execution of the application that is being containerized. More particularly, the data collection module collects information of the existing computing device, hosts and components associated therewith, and the data provided by users about the computing device. The data analyzing module is configured to analyze in an automated manner the cleaned data received from the data collection module and determine patterns and anti-patterns in a process of application transformation. The pattern recognition module is configured to detect new applications/new application postures. The pattern recognition module looks and analyses new unknown information for identifying new applications. The training module is configured to receive new patterns identified along with old patterns from the pattern recognition module and generates rules and a statistical model to recognize the applications. The feature generation module is configured to generate new capabilities for detecting new applications/refining existing understanding of applications based on the new statistical model and training data. The feedback module is configured to apply machine learning from newer data points and codes the data points into application transformation.

In another aspect, the present invention provides a method for detection of patterns in application for application transformation and applying those patterns for automated application transformation.

BRIEF DESCRIPTION OF THE DRAWINGS

The objects and advantages of the present invention will become apparent when the disclosure is read in conjunction with the following figures, wherein

FIG. 2 shows a flowchart of a method for detection of patterns in application for application transformation and applying those patterns for automated application transformation, in accordance with the present invention.

Figure 1:
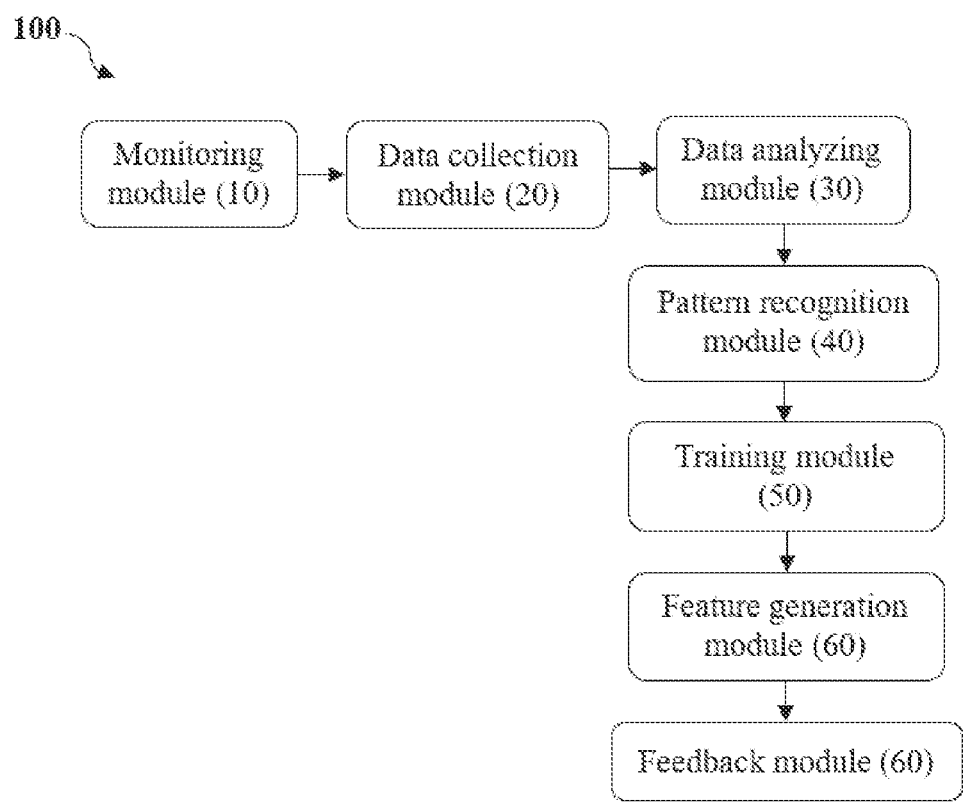
FIG. 1 is a block diagram of a system for detection of patterns in application for application transformation and applying those patterns for automated application transformation, in accordance with the present invention.

It should be appreciated by those skilled in the art that any block diagrams herein represent conceptual views of illustrative systems embodying the principles of the present invention. Similarly, it will be appreciated that any flowcharts, flow diagrams, and the like represent various processes which may be substantially represented in computer readable medium and so executed by a computer or processor, whether or not such computer or processor is explicitly shown.

DETAILED DESCRIPTION OF THE INVENTION

The foregoing objects of the invention are accomplished, and the problems and shortcomings associated with prior art techniques and approaches are overcome by the present invention described in the present embodiments.

The embodiments herein provide a system and a method for detection of patterns in application for application transformation and applying those patterns for automated application transformation. Further the embodiments may be easily implemented in data, information communication and management structures. Embodiments may also be implemented as one or more applications performed by stand alone or embedded systems.

The systems and methods described herein are explained using examples with specific details for better understanding. However, the disclosed embodiments can be worked on by a person skilled in the art without the use of these specific details.

Throughout this application, with respect to all reasonable derivatives of such terms, and unless otherwise specified (and/or unless the particular context clearly dictates otherwise), each usage of:

"a" or "an" is meant to read as "at least one."

"the" is meant to be read as "the at least one."

References in the specification to "one embodiment" or "an embodiment" mean that a particular feature, structure, characteristic, or function described in connection with the embodiment is included in at least one embodiment. The appearances of the phrase "in one embodiment" in various places in the specification are not necessarily all referring to the same embodiment.

Hereinafter, embodiments will be described in detail. For clarity of the description, known constructions and functions will be omitted.

Parts of the description may be presented in terms of operations performed by at least one electrical/electronic circuit, a computer system, using terms such as data, state, link, fault, packet, and the like, consistent with the manner commonly employed by those skilled in the art to convey the substance of their work to others skilled in the art. As is well understood by those skilled in the art, these quantities take the form of data stored/transferred in the form of non-transitory, computer-readable electrical, magnetic, or optical signals capable of being stored, transferred, combined, and otherwise manipulated through mechanical and electrical components of the computer system; and the term computer system includes general purpose as well as special purpose data processing machines, switches, and the like, that are standalone, adjunct or embedded. For instance, some embodiments may be implemented by a processing system that executes program instructions so as to cause the processing system to perform operations involved in one or more of the methods described herein. The program instructions may be computer-readable code, such as compiled or non-compiled program logic and/or machine code, stored in a data storage that takes the form of a non-transitory computer-readable medium, such as a magnetic, optical, and/or flash data storage medium. Moreover, such processing system and/or data storage may be implemented using a single computer system or may be distributed across multiple computer systems (e.g., servers) that are communicatively linked through a network to allow the computer systems to operate in a coordinated manner.

The present invention provides a system and a method for detection of patterns in application for application transformation and applying those patterns for automated application transformation. The system and the method enable user to identify patterns in transformation of the application from existing infrastructure/machines of organization. The transformed application thus created are easily exported and/or installed on multiple computing devices having different system architecture and successful execution of the application containerized within the container is facilitated.

The present invention is now illustrated with reference to the accompanying drawings, throughout which reference numbers indicate corresponding parts in the various figures. These reference numbers are shown in bracket in the following description.

Referring to FIG. 1, a system (100) for intelligent pattern recognition in application transformation in accordance with the present invention is shown. The system (100) helps in creating one or more containers of transformed applications (hereinafter referred to as "the transformed application") for at least one computer application (hereinafter referred to as "the application") running on at least one computing device. In the context of the present invention, the term "application container" refers to a cluster of files required to successfully execute said application on any computing device. In the context of the present invention, the term "computing device" refers to a computer system having, but not limited to, an operating system and a processor embedded therein, a memory unit, and an input-output unit operably coupled with each other. The memory unit includes a plurality of instructions stored therein for processing by the processor for operation of the computing device. The input-output unit includes a camera, a display unit and a keypad. In an embodiment, the computing device includes, but not limiting thereto, a desktop computer, a laptop computer, a tablet computer, a television with one or more processors embedded therein and/or coupled thereto, a smart phone, a hand-held computer, a personal digital assistant ("PDA"), or any other wired or wireless processor-driven device. In another embodiment, the computing device includes a server.

In accordance with the present invention, the system (100) is configured on the computing device for secure execution of a plurality of conflicting sets of the application configured thereon for performing a plurality of tasks. Particularly, the system (100) identifies the patterns involved in transformation of the application that is specific for each of the application such that each of the patterns recognized on the operating system residing permanently on the computing device for simultaneous execution of each of said application. The system (100) may use graphics processing units (GPUs) in order to speed up the processing.

As shown in FIG. 1, the system (100) comprises a monitoring module (10), a data collection module (20), a data analyzing module (30), a pattern recognition module (40), a training module (50), a feature generation module (60) and a feedback module (70). All the modules of the system (100) are operably coupled with each other.

The monitoring module (10) collects new datasets about application/software under observation (candidates for discovery/transformation). The monitoring module (10) also provides users the ability to contribute to the data classification/verification/labeling in order to increase accuracy of the data. Specifically, the monitoring module (10) monitors the application service behavior and collects meta-data from the software systems being discovered. During the discovery, the monitoring module (10) collects lots of meta-data from the systems under observation. This data is passed onto the data collection module (20). In the context of the present invention, the data is passed through connected systems over the network and is transmitted over secure channels to maintain security of the data.

The data collection module (20) classifies and cleans the data received from the monitoring module (10). The data collection module (20) facilitates automated capturing of requisite data files associated with the application configured on the existing computing device which is to be containerized. Particularly, the data collection module (20) collects data regarding the system architecture of the existing computing device. More particularly, the data collection module (20) collects all the requisite files required for independent execution of the application that is being containerized. In an embodiment, the data collection module (20) collects information about the existing computing device, hosts and like components associated therewith. In another embodiment, the data collection module (20) collects data provided by users i.e. customers/clients about the computing device. The data is prepared for analysis for consistency and incomplete data is flagged. Particularly, the data for which id duplicate is removed, and data which is incomplete is flagged or if possible, is substituted with default values. If any datasets are not complete, the data collection module (20) requests more information from the monitoring module (10). Once cleaned data is prepared, the data is passed for analysis.

The data analyzing module (30) analyzes in an automated manner the cleaned data received from the data collection module (20) and determines patterns and anti-patterns in the process of application transformation. In the context of the present invention, the patterns are derived from file and network operations for example, application being stateful/stateless, technology detection and like. In the context of the present invention, the anti-patterns are patterns described earlier but are marked as counter-productive for example, a database configuration which is not recommended or enabling experimental settings in the build which are meant for production deployment. Particularly, the data analyzing module (30) provides a list of patterns and actions to be taken during transformation of the application. All the anti-patterns detected are flagged out and a severity index is given to the detected anti-pattern by the data analyzing module (30). An interface is provided to make amends in the configurations, including and excluding artefacts to supplement the automated process. The pattern recognition is the primary function of the data analysis module (30). Specifically, new set of cleaned data along with historical data is analyzed for patterns.

The pattern recognition module (40) detects new applications/new application postures. The pattern recognition module (40) ensures that the known applications patterns are reconfirmed/validated. The pattern recognition module (40) also looks and analyses the new unknown information for identifying new applications. The user's data labels/application labels are beneficial in improving the accuracy of the pattern recognition.

The training module (50) receives new patterns identified along with old patterns from the pattern recognition module (40) and generates/refines the rules and a statistical model to recognize the applications, programming stacks and/or new software systems. The training module (50) makes sure that the new data is used to change the model to reflect/refine patterns. There is a library of patterns which are pre-stored against which the newly detected patterns are compared. The library of pre-stored patterns is extended through a feedback mechanism.

The feature generation module (60) generates new capabilities for detecting new applications/refining existing understanding of applications based on the new statistical model and training data. These additional capabilities need to be relayed to the application transformation engine. That is done via communication through the feedback module (70).

The feedback module (70) applies machine learning from the newer data points and codes the data points into application transformation software system. The feedback module (70) is primarily responsible for safe transition from the existing statistical model to the refined model.

Referring to FIG. 2, in another aspect, the present invention provides a method for detection of patterns in application for application transformation and applying those patterns for automated application transformation. The method helps in establishing a secure environment for executing on the single computing device, a multiple conflicting set of the applications using shared resources of the computing device. Specifically, the method is described herein below in conjunction with the system (100) of FIG. 1.

At step (201), the method involves accessing the system (100) by a user using login credentials. The user upon login discovers the applications/software under observation and verifies the discovered information (labeling) and/or provide feedback on the information discovered by the monitoring module (10). The system (100) also allows the user to correct/improve discovery information for existing systems. For unknown applications, the user has the ability to identify application name, programming stack and like. The system (100) has the ability to derive patterns based on software behaviour, software interactions, software environment parameters and/or runtime information and software contents. The software architects are the users that can perform these actions on the data.

At step (202), the method involves classifying and cleaning the data received from the monitoring module (10) by the data collection module (20). The data is classified based on type into a file system data and a network system interaction data. The file system interaction data is further classified into configuration data, logging data, and credentials data. In the cleaning step, the classified data is compared against a standard set of rules which can be ignored and by applying ignore rules the data is cleaned.

At step (203), the method involves analyzing the cleaned data by the data analyzing module (30) to determine patterns and anti-patterns in a process of application transformation. After classification and cleaning, the file system data and the network interaction data are analyzed by applying methods such as removal of duplicates, outlier detection and removal of irrelevant data, substituting or handling for the missing data. In the context of the present invention, the patterns are derived from file and network operations for example, application being stateful/stateless, technology detection and like. In the context of the present invention, the anti-patterns are patterns described earlier but are marked as counter-productive for example, a database configuration which is not recommended or enabling experimental settings in the build which are meant for production deployment. Particularly, the data analyzing module (30) provides a list of patterns and actions to be taken during transformation of the application. All the anti-patterns detected are flagged out and a severity index is given to the detected anti-pattern by the data analyzing module (30). An interface is provided to make amends in the configurations, including and excluding artefacts to supplement the automated process.

At step (204), the method involves detecting new applications/new application postures by the pattern recognition module (40). The pattern recognition module (40) makes use of trained models (rules). Every trained model is provided with features (data points) as an input in an attempt to predict the application posture.

At step (205), the method involves receiving new patterns identified along with old patterns from the pattern recognition module (40) by the training module (50). The training module (50) generates/refines the rules and the statistical model to recognize the applications. The training module (50) takes new features generated as an input which are used for training/generating models/rules.

At step (206), the method involves generating new capabilities by the feature generation module (60) for detecting new applications/refining existing understanding of applications based on the new statistical model and training data. If the detected pattern for application does not match with existing patterns. The pattern for the new applications is annotated and becomes available for future detections.

At final step (207), the method involves applying machine learning from the newer data points by the feedback module (70) and coding the data points into application transformation software system. This makes the models (rules) richer i.e. capable of handling more features/inputs and increases the prediction capabilities for the future application transformations.

In accordance with the present invention, the system (100) and the method facilitate pattern recognition of application transformation of the computing device by associating the application and required data files with the transformed application for execution of the application irrespective of surrounding environment. The system (100) and the method enable user to identify patterns in transformation of the application from existing infrastructure/machines of organization. The transformed application thus created are easily exported and/or installed on multiple computing devices having different system architecture and successful execution of the application containerized within the container is facilitated. The system (100) and the method for automating the containerization process are based on data analytics, machine learning and artificial intelligence techniques. The system (100) and the method cover a wide array of software frameworks without compromising stability of the application which is to be containerized. The system (100) and the method provide automated data collection, automated data analysis and decision making about identification of the applications for containerization based on data analytics, machine learning and artificial intelligence techniques. The system (100) and the method provide solution for a plurality of tasks associated with the intelligent application modernization.

ADVANTAGES OF THE INVENTION

The system (100) and the method automate the identification of patterns involved in transformation of the application and applying those patterns for automated plurality of application transformations.

The system (100) and the method reduce dependency on individual skills and ability.

The system (100) and the method bring consistency and efficiency in application transformation.

The system (100) and the method increase performance of existing techniques that effect application transformation.

The system (100) and the method enable providing predictable timelines.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the scope of the present invention.

We claim:

1. A system for detection of patterns in application for application transformation and applying those patterns for automated application transformation, the system being configured on a computing device, the system comprising:
   a monitoring module, the monitoring module configured to collect new datasets about an application under observation, wherein meta-data of the application under observation is collected;
   a data collection module, the data collection module configured to classify and clean the data received from the monitoring module, wherein the data collection module collects all requisite files required for independent execution of the application that is being containerized;
   a data analyzing module, the data analyzing module configured to analyze in an automated manner the cleaned data received from the data collection module and determine patterns and antipatterns in a process of application transformation;
   a pattern recognition module, the pattern recognition module configured to detect new applications or new application postures, wherein the pattern recognition module looks and analyses a new unknown information for identifying new applications;
   a training module, the training module configured to receive new patterns identified along with old patterns from the pattern recognition module, and generate rules and a statistical model to recognize the applications;
   a feature generation module, the feature generation module configured to generate new capabilities for detecting new applications or refining existing understanding of applications based on the new statistical model and training data; and
   a feedback module, the feedback module configured to apply machine learning from newer data points and code the data points into application transformation;
   wherein the data collection module collects information of the computing device, hosts and components associated therewith, and data provided by users about the computing device.

2. The system as claimed in claim 1, wherein the data collection module classifies the data based on type into a file system data and a network system interaction data.

3. A method for detection of patterns in application for application transformation and applying those patterns for automated application transformation, the method comprising the steps of:
   discovering, by a user, an application under observation upon accessing a system and verifying an information discovered by a monitoring module, wherein the monitoring module collects meta-data of the application under observation;
   classifying and cleaning, by a data collection module, the data received from the monitoring module;
   analyzing, by a data analyzing module, the cleaned data to determine patterns and anti-patterns in a process of application transformation;
   detecting, by a pattern recognition module, new applications or new application postures by using trained rules;

receiving, by a training module, new patterns identified along with old patterns to generate or refine rules and a statistical model to recognize the applications;

generating, by feature generation module, new capabilities for detecting new applications/refining existing understanding of applications based on the new statistical model and training data; and applying, by a feedback module, machine learning from the newer data points and coding the data points into application transformation software system;

wherein the data collection module collects information of the computing device, hosts and components associated therewith, and data provided by users about the computing device.

4. The method as claimed in claim 3, wherein the data collection module classifies the data into a network system interaction data and a file system data that is further classified into configuration data, logging data, and credentials data.

5. The method as claimed in claim 3, wherein the data is cleaned by comparing the classified data against a standard set of rules and by applying ignore.

6. The method as claimed in claim 3, wherein file system data and network interaction data are analyzed by applying methods including removal of duplicates, outlier detection and removal of irrelevant data, or substituting or handling for the missing data.

7. The method as claimed in claim 3, wherein all antipatterns detected are flagged out and a severity index is given to the detected anti-pattern by the data analyzing module.

8. A system for detection of patterns in application for application transformation and applying those patterns for automated application transformation, the system being configured on a computing device, the system comprising:

a monitoring module, the monitoring module configured to collect new datasets about an application under observation, wherein meta-data of the application under observation is collected;

a data collection module, the data collection module configured to classify and clean the data received from the monitoring module, wherein the data collection module collects all requisite files required for independent execution of the application that is being containerized;

a data analyzing module, the data analyzing module configured to analyze in an automated manner the cleaned data received from the data collection module and determine patterns and antipatterns in a process of application transformation;

a pattern recognition module, the pattern recognition module configured to detect new applications or new application postures, wherein the pattern recognition module looks and analyses a new unknown information for identifying new applications;

a training module, the training module configured to receive new patterns identified along with old patterns from the pattern recognition module, and generate rules and a statistical model to recognize the applications;

a feature generation module, the feature generation module configured to generate new capabilities for detecting new applications or refining existing understanding of applications based on the new statistical model and training data; and a feedback module, the feedback module configured to apply machine learning from newer data points and code the data points into application transformation;

wherein the data collection module classifies the data based on type into a file system data and a network system interaction data.

* * * * *